Dec. 13, 1938.   W. H. MOFFATT   2,140,164
HOOK COUPLING
Filed Dec. 24, 1937

INVENTOR.
William H. Moffatt.
BY Maxwell E. Sparrow
ATTORNEY.

Patented Dec. 13, 1938

2,140,164

UNITED STATES PATENT OFFICE 2,140,164

HOOK COUPLING

William H. Moffatt, Bergen County, N. J., assignor to Robert M. Kristal, New York, N. Y.

Application December 24, 1937, Serial No. 181,525

3 Claims. (Cl. 24—198)

This invention relates to improvements in hook-couplings and more particularly to hook-couplings used in connection with brassières, bandeaux, garters, belts, shoulder straps, or the like.

Heretofore couplings for use in joining ends of parts of wearing apparel comprised a closed slot through which one of the parts was looped and then stitched to secure said part to said closed slot and an open slot to guide the other part into the bight and so maintained. The looping through method of securing the part to be attached to the hook's closed slot is an expensive and tedious way of inserting the part.

It is a primary object of this invention to provide a hook-coupling which will eliminate completely the necessity of inserting and looping through the closed slot the part to be secured thereto by providing an inner passageway to guide the part to be secured into the otherwise closed slot thus obviating the cumbersome method heretofore observed and thus making for greater economy and speed of production.

It is an object of this invention to provide a flat, one-piece, simple practical and efficient coupling to join ends of wearing apparel parts together.

It is another object of this invention to provide a flat, one-piece hook-coupling so constructed as to easily and conveniently guide the parts to be hooked into their respective positions, and to be maintained in such positions after they have been so guided.

It is another object of this invention to provide a hook-coupling which can be readily applied to any suitable garment without changes to the garment.

It is another object to provide a hook-coupling so designed as to prevent accidental disengagement while wearing and using the garment.

These several advantages, objects and others are attained by the novel design, construction and arrangement as hereinafter described and illustrated in the accompanying drawing, constituting features of this invention and in which.

Figure 1:
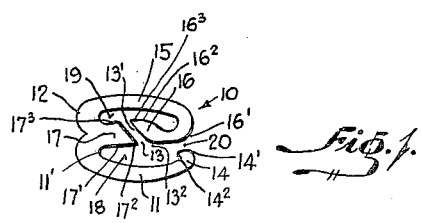
Fig. 1 is an elevational view of a coupling embodying the invention.

Hook coupling 10 as shown in the drawing comprises in its general aspect a hook portion and a loop portion joined by a common wall having a passageway in the latter substantially midway therein communicating with both the loop and hook portions to enable insertion of a looped strap through the hook and passageway for adjustment within the loop; the hook portion being adapted for receiving another looped strap for locking engagement therewith.

The hook portion comprises the substantially arcuately shaped hook wall 11 provided at its free end with a stop or check 14 for retaining the strap or garment part B as shown. The stop 14 preferably has a flattened edge 14' at its tip cooperating with the flattened side 16' of the intermediate wall 16 for facilitating guidance of the loop strap therein.

The loop portion comprises the substantially arcuate loop wall 15 having its upper free end reentrantly directed to provide the intermediate wall section 16.

Figure 2:
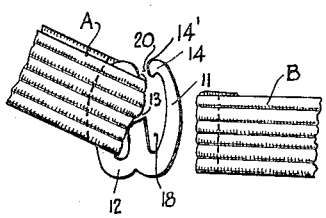
Fig. 2 is a view showing one loop being inserted through the slot on the inner wall.
Figure 3:
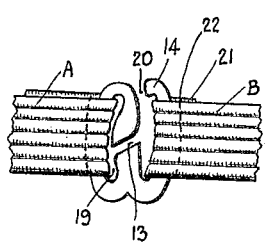
Fig. 3 is a view showing both parts to be joined in their respective attached positions.

This wall section 16 preferably diverges from the point where it substantially reenters the coupling to its end which provides the flat side 16' and the sides 16" to somewhat constrict the opening or slot 19. The passageway 13 is formed by spacing the common wall sections 16 and 17, the latter being an extension of the juncture of the loop and the hook portions. The passageway 13 is preferably sloped and the wall 32 connecting the passageway wall 13' with the flat side 16' is rounded to act as a guide and facilitate the easy slipping off the loop of strap A through the passageway 13 as shown in Fig. 2. The extension 17 is sloped at its free end parallel with the opposite wall or end B', and its side 17' is in substantial alignment with the side 16' of the section 16. Because of the rounded tip of the corner 13", the edge of the inserted loop of the strap A will be guided by said corner to clear the tip $17^2$ of extension 17 and into the passageway 13; and the diagonally opposite rounded corner 17''' facilitates the complete and easy guidance of the strap A into the slot 19.

It is to be noted that the diagonally opposite corners $17^2$ and 16''' are preferably substantially pointed.

It has heretofore been the custom to loop the span or strap A through the closed slot 19 and then stitch it together. By my invention which provides the sloping passageway 13 in the common wall, the necessity for looping through is obviated. All that is required is to preform a looped strap A and insert it in the holder portion by way of the passageway 13. As herein described, the other part B to be joined is also usually formed into a loop which is slipped over the hook portion 11 retained in position and prevented from accidental disengagement by the check 14.

The hook coupling is substantially W-shaped, with one of its free arms reentrantly directed so as to provide the closed loop wall 15, and the inwardly directed wall 16, the wall 16 as hereinabove stated being widened adjacent the passageway 13 in order among other things to reduce the slot 19 in width substantially midway between the upper and lower ends of the slot. This prevents such play as might tend to disengage the retained strap when used by the wearer.

It is convenient to so locate the passageway 13 with the opening 20 as to permit the easy insertion into the passageway of the loop of the strap A by a slight tipping of the part A and its subsequent looping over the wall and into the slot 19.

The sides 16' and 17' of the common wall sections 16, 17 respectively which form part of the hook portion of the coupling, slope toward the base 11' of the hook wall 11 to constrict the lower portion of the slot 18 and provide an abutment to lessen the play of a strap B when inserted in the hook portion.

The tip 14' of the stop 14 is in substantial alignment with the corner 17² and the recess 14" is in substantial alignment with the recess 11'.

Figure 4:
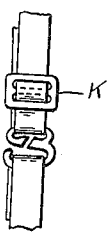
Fig. 4 is a view showing the device embodying the invention employed on shoulder straps.

Fig. 4 exemplifies a shoulder strap employing my invention making possible the disengagement of the shoulder strap, with little or no trouble. The buckle K permits adjustment of the shoulder strap. Of course my invention may be employed in lieu of the buckle K to perform a similar function, i. e., the adjustment of the shoulder strap.

Although the drawing, and the above specification discloses the best mode in which I have contemplated embodying my invention, I desire in no way to be limited to the details of such disclosure, for in the further practical application of my invention changes in the forms and proportions may be made as circumstances require or experience suggests without departing from the spirit of the invention within the scope of the appended claims.

Having thus described my invention what I claim as new and desire to secure by Letters Patent, is:

1. A coupling device comprising a plate-like body, substantially in the shape of a W, having a pair of arms and a juncture connecting said arms, said juncture extending within said body substantially midway, one of said arms projecting within said body adjacent to and in alignment with said juncture and spaced therefrom providing a passageway, the other of said arms being widened at its free end, and constituting with said projection and said juncture a second loop, whereby a device to be coupled may be slid through the opening of the first mentioned loop and into the opening of the second loop through said passageway, said first loop for joining another device to said body.

2. A hook coupling comprising a hook portion and a loop portion joined by a common wall, said loop portion having a slot with both ends closed, said hook portion having a slot open at one end, said common wall having a passageway substantially midway between its ends and communicating with said loops, said passageway dividing said common wall into two sections, one section of which having sides diverging towards said passageway and having a rounded corner at said passageway the other of said sections having a rounded corner diagonally opposite said first-mentioned section, said corners facilitating guidance of a looped part through said passageway into said loop portion.

3. A hook coupling comprising a hook portion and a loop portion joined by a common wall, said loop portion having a slot with both ends closed, said hook portion having a slot open at one end, said common wall having a passageway substantially midway between its ends and communicating with said loop portion and hook portion, the side of said common wall adjacent the hook portion and forming part thereof sloping toward the bight of the hook portion forming a constriction of the hook portion slot substantially at said bight.

WILLIAM H. MOFFATT.